(12) United States Patent
Zettler, Jr.

(10) Patent No.: US 11,461,782 B1
(45) Date of Patent: Oct. 4, 2022

(54) DISTINGUISHING HUMANS FROM COMPUTERS

(75) Inventor: William Randolph Zettler, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1682 days.

(21) Appl. No.: 12/457,446

(22) Filed: Jun. 11, 2009

(51) Int. Cl.
*G06Q 20/40* (2012.01)

(52) U.S. Cl.
CPC .................................. *G06Q 20/409* (2013.01)

(58) Field of Classification Search
CPC ... G06F 7/04; G06F 7/00; G06F 15/16; G06F 17/247; G06F 17/30056; G06F 21/36; G06F 21/10; G06F 2211/007; G06F 21/00; A61B 5/00; G06K 9/00456; G06Q 30/06; H04L 63/0428; H04L 2463/101; H04L 63/0227; H04L 63/0263; H04L 63/0236; H04L 3/1404; H04L 63/1441
USPC .................. 705/50–59; 726/26–28; 600/322; 707/104.1; 709/225, 206; 713/182; 715/228
See application file for complete search history.

(56) References Cited

U.S. PATENT DOCUMENTS

| | | | |
|---|---|---|---|
| 5,640,466 A * | 6/1997 | Huttenlocher | G06K 9/00 382/177 |
| 6,463,426 B1 * | 10/2002 | Lipson et al. | |
| 7,891,005 B1 * | 2/2011 | Baluja | G06F 21/36 726/26 |
| 8,352,598 B2 * | 1/2013 | Nyang | G06F 21/36 705/71 |
| 8,555,353 B2 * | 10/2013 | Von Ahn | G06F 21/36 726/5 |
| 2004/0001634 A1 * | 1/2004 | Mehrotra | G06T 9/00 382/232 |
| 2004/0024296 A1 * | 2/2004 | Krotkov | A61B 5/0059 600/322 |
| 2004/0133927 A1 * | 7/2004 | Sternberg | G06F 16/7328 725/136 |
| 2005/0216564 A1 * | 9/2005 | Myers | H04L 51/12 709/206 |
| 2006/0165287 A1 * | 7/2006 | Huang | H04N 1/6072 382/176 |

(Continued)

OTHER PUBLICATIONS

Ron White, How Computers Work, Oct. 15, 2003, Que Publishing, 7th Ed, p. 4.*

(Continued)

*Primary Examiner* — Patrick McAtee
*Assistant Examiner* — Nakia Leffall-Allen
(74) *Attorney, Agent, or Firm* — Davis Wright Tremaine LLP

(57) ABSTRACT

Systems and methods are provided that distinguish humans from computers. In one implementation, a computer-implemented method selects, from a storage device, a plurality of images. The method further generates a document comprising the plurality of images for the security challenge. At least one image included in the plurality of images is oriented for display in a different direction than the other images. The method further receives a selection of one or more images included in the plurality of images and determines whether the selected one or more images is oriented for display in a different direction than the other images.

20 Claims, 5 Drawing Sheets

(56) References Cited

U.S. PATENT DOCUMENTS

| | | | |
|---|---|---|---|
| 2007/0053513 A1* | 3/2007 | Hoffberg | G06K 9/00369 380/201 |
| 2007/0201745 A1* | 8/2007 | Wang | G06K 9/00 382/181 |
| 2007/0226260 A1* | 9/2007 | Williams | G06F 16/40 |
| 2008/0065685 A1* | 3/2008 | Frank | G06F 16/29 |
| 2009/0232351 A1* | 9/2009 | Kagitani | H04N 21/25875 382/100 |
| 2010/0111396 A1* | 5/2010 | Boucheron | 382/133 |
| 2010/0275114 A1* | 10/2010 | Bastos dos Santos | G06F 40/183 715/228 |

OTHER PUBLICATIONS

Ron White, How Computers Work, Oct. 15, 2003, Que Publishing, 7th Ed, p. 4 (Year: 2003).*

The Official CAPTCHA Site, "CAPTCHA: Telling Humans and Computers Apart Automatically," http://www.captcha.net/, retrieved Jun. 11, 2009 (4 pages).

ASIRRA—Microsoft Research, "ASIRRA," http://research.microsoft.com/en-us/um/redmond/proiects/asirra, retrieved Jun. 11, 2009 (3 pages).

KittenAuth—Projects—The PCSpy.com, "KittenAuth," http://www.thepcspy.com/kittenauth, retrieved Jun. 11, 2009 (5 pages).

* cited by examiner

DISTINGUISHING HUMANS FROM COMPUTERS

BACKGROUND

In modern computing, computer programs that automate human tasks have become more common. Certain computer programs, which are referred to as automated robots or so-called "bots," provide tools that automate tasks, such as crawling through web pages to scan and gather keywords, text, and links. Computer programs can also masquerade as humans to gather information from web sites, such as customer information, or automatically purchase large quantities of a desired commodity or a commodity being sold at a promotional price. Since a computer program can act automatically and more rapidly than a human, a computer program can compromise data for a large number of accounts or assist a single buyer in purchasing large quantities of a commodity in a short time span.

To combat such automated bots, web sites have implemented measures that attempt to determine whether a human or a computer generated a response to a is requesting a network resource using a security challenge. One type of security challenge is called a CAPTCHA (Completely Automated Public Turing test to tell Computers and Humans Apart). A CAPTCHA provides a challenge-response test that is designed to ensure that a computer did not generate a response to the test. A web site may use a CAPTCHA to protect a network resource from automated attack or to prevent the same buyers from automatically buying large quantities of a desired commodity or a commodity offered at a promotional price.

In a typical CAPTCHA, a computer provides an entity attempting to access a network resource with a test, the computer receives a response to the test from the user, and the computer evaluates whether or not the response to the test is correct. A CAPTCHA is designed to provide a test that is relatively simple for a human to solve, but, at the same time, poses a challenge for a computer to decipher. For example, a CAPTCHA might require a user to type letters or digits that appear in an image. Such an image is often distorted in some fashion to hinder a computer from using optical character recognition (OCR) technology to read the letters or digits that appear in the image. As the image is relatively easy to discern by a human, but is difficult for a computer to discern in an automated fashion, a correct solution to the test is presumed to have been submitted by a human.

CAPTCHAs are premised upon the rationale that humans solve visual puzzles more accurately than computers. However, as approaches for automatically circumventing CAPTCHAs have become more sophisticated, computer programs have been able to determine the text or digits within the CAPTCHAs with increased accuracy. To combat this escalation in program sophistication, CAPTCHAs have also evolved in an attempt to improve the security that they provide. Some modern CAPTCHAs provide more sophisticated tests, such as tests that require a user to distinguish real-world features appearing in images. Such a test might require a user to select a particular type of image from a group of images. For example, distinguishing a photograph of a dog from a photograph of a cat is simple for a human to accomplish, but such a task remains relatively difficult for a computer program to solve with consistency.

Programmers that are willing to expend enough resources, however, can compromise even these more sophisticated CAPTCHAs, such as the ones that use photographs. Modern tests remain susceptible to compromise because, among other problems, the tests suffer from limited vocabularies, i.e., the images that are available for the tests originate from finite image and/or relatively small libraries. For example, if there are 10,000 images for a particular test, a programmer wanting to solve that test merely needs to solve the 10,000 images with humans and record the results. The programmer could then generate short-hand numerical representations for each image in the test, such as a hash key, that could be used by a computer program to automate the process of solving the test. The computer program may, for example, compare the numerical representations against images appearing in the test in order to properly identify the images. Consequently, even modern CAPTCHAs that use images, such as photographs, are susceptible to being compromised through automated attacks.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
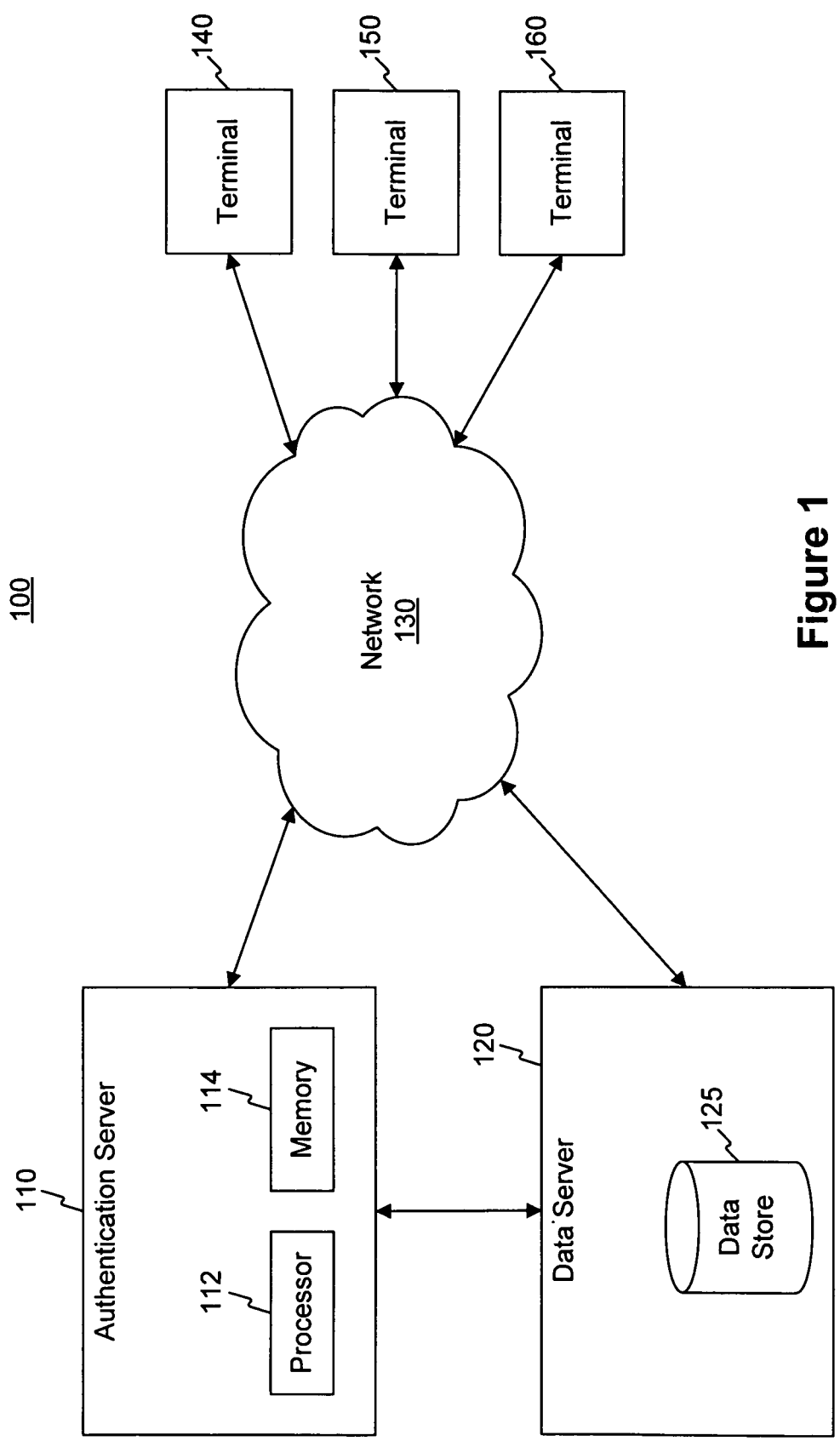
FIG. 1 is a diagram of an example of a system for distinguishing humans from computers using images.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, or adding blocks to the disclosed methods. Accordingly, the following detailed description is not limiting of the disclosed embodiments. Instead, the proper scope is defined by the appended claims.

Disclosed embodiments provide computer-implemented systems and methods for distinguishing humans from computers using images. As used herein, an "image" is plurality of color and/or light intensity values (e.g., pixels) that are arranged to provide visual information. The systems and methods may provide security challenges that present, for example, images of a particular item that is made available via an electronic catalog. The images that are presented may be altered (e.g., the images may be manipulated such that text is warped) to hinder computer programs from easily using OCR technology to read the text. Alternatively, or in addition, the images may be presented such that some of the images are flipped or rotated over one axis or another (e.g., displayed upside-down, sideways, rotated a number of degrees, etc.). To respond to a security challenge correctly, a user may need to identify or select images that are presented differently from other images (e.g., identify or select the images that are displayed upside-down). Disclosed embodiments may obtain images for security challenges from a large and dynamic library of images, providing a large and evolving vocabulary for the security challenges to preclude automated attacks by computer programs.

Consistent with a disclosed embodiment, a computer-implemented method provides a security challenge. The method may include selecting, from a storage device, a plurality of images. The plurality of images may represent items in an electronic catalog. The method may further generate a document for the security challenge comprising the plurality of images. At least one image included in the plurality of images may be oriented such that text appearing on the at least one image is upside-down and the other images may be oriented such that text appearing on the other images is right-side up. The method may receive a selection of one or more images included in the plurality of images and determine whether the received selection is an identification of the at least one image that is oriented upside-down in the document.

Consistent with another disclosed embodiment, a computer-implemented method provides a security challenge. The method may include selecting, from a storage device, a plurality of images. The method may further generate a document for the security challenge comprising the plurality of images. At least one image included in the plurality of images may be oriented for display in a different direction than the other images. The method may further receive a selection of one or more images included in the plurality of images and determine whether the selected one or more images is oriented for display in a different direction than the other images.

Consistent with yet another disclosed embodiment, a system provides a security challenge. The system may comprise a data server and an authentication server. The data server may comprise a processor and a data store. The authentication server may be in communication with the data server. The authentication server may be operable to select, from the data store, a plurality of images, and generate a document for the security challenge comprising the plurality of images. At least one image included in the plurality of images may be oriented for display in a different direction than the other images. The authentication server may further receive a selection of one or more images included in the plurality of images and determine whether the selected one or more images is oriented for display in a different direction than the other images.

Consistent with other disclosed embodiments, computer-readable mediums are provided that store program instructions, which when executed by a processor, perform any of the above-described methods.

FIG. 1 is an example of a system 100 for distinguishing humans from computers using images, consistent with a disclosed embodiment. System 100 may provide functionality for providing a security challenge and evaluating whether a response to the security challenge is correct (e.g., the expected result). As shown in system 100, authentication server 110, data server 120, and terminals 140-160 are connected to a network 130. One of skill in the art will appreciate that although one authentication server, one data server, and three terminals are depicted in FIG. 1, any number of these components may be provided. Furthermore, one of ordinary skill in the art will recognize that one or more components of system 100 may be combined and/or divided into subcomponents. For example, functionality provided by authentication server 110 and data server 120 may be combined or functionality provided by authentication server 110 may be subdivided across multiple components.

Network 130 provides communications between the various components in system 100, such as authentication server 110, data server 120, and terminals 140-160. In addition, authentication server 110, data server 120, and/or terminals 140-160 may access legacy systems (not shown) via network 130, or may directly access legacy systems, data stores, or other network applications. Network 130 may be a shared, public, or private network, may encompass a wide area or local area, and may be implemented through any suitable combination of wired and/or wireless communication networks. Network 130 may further comprise an intranet or the Internet.

Authentication server 110 may comprise a general purpose computer (e.g., a personal computer, network computer, server, or mainframe computer) having one or more processors that may be selectively activated or reconfigured by a computer program. Authentication server 110 may also be implemented in a distributed network. For example, authentication server 110 may communicate via network 130 with one or more additional authentication servers (not shown), which may enable authentication server 110 to distribute processes for parallel execution by a plurality of authentication servers. Alternatively, authentication server 110 may be specially constructed for carrying-out methods consistent with disclosed embodiments.

Authentication server 110 may include a processor 112 and a memory 114. Memory 114 may comprise one or more memory or storage devices that store data as well as software. Memory 114 may also comprise, for example, one or more of RAM, ROM, magnetic storage, or optical storage. Memory 114 may store program modules that, when executed by processor 112, perform one or more processes for operating an Internet site or other server process. For example, authentication server 110 may provide access to an Internet site, as well as provide functionality for authenticating users and providing access to data, such as user accounts (e.g., retail store accounts, e-mail accounts, social networking accounts, etc.), provide access to content (e.g., articles, audio, video), and/or provide access to information (e.g., product listings) in connection with the sale of products and/or services. Program modules are discussed below in further detail in connection with FIG. 2.

Data server 120 may comprise a general purpose computer (e.g., a personal computer, network computer, server, or mainframe computer) having one or more processors (not shown) that may be selectively activated or reconfigured by a computer program. Furthermore, data server 120 may communicate via network 130 or may be in direct bilateral communication with authentication server 110. Data server 120 may also be implemented in a distributed network. For example, data server 120 may communicate via network 130 with one or more additional data servers (not shown) storing additional data.

Data server 120 may include a data store 125. In one embodiment, data store 125 may constitute an electronic catalog data store and may store data describing various items. For example, the items may be products and/or services offered for sale, rental, download, or other consumption, by an Internet site provided by authentication server 110. For example, data store 125 may store static and/or dynamically generated pages that are displayable by a computer executing software, such as an Internet browser. Furthermore, data store 125 may store product and/or service descriptions, prices, and media used in connection with the sale of the products and/or services. Media may include any images, photographs, sounds, and/or video clips that provide samples and/or information pertaining to the products and/or services. Furthermore, images for products may include or otherwise represent displayable text (e.g., a typical book cover includes a title and an author's name).

Products and/or services having information stored in data store 125 may be associated, for example, with a unique identifier, such as a product identifier (ID). Product IDs may include product names and/or product numbers, UPCs (Universal Product Codes), ISBN (International Standard Book Number), or any other identifier. Additionally, data store 125 may store metadata in association with product IDs. For example, the metadata may provide information describing and/or classifying a product (e.g., classifying a novel by genre by associating metadata of "horror" with a product ID for a horror novel). Other metadata stored in association with, for example, images, may indicate whether or not the images are appropriate for security challenges. Generating such metadata is discussed below in further detail.

Consistent with other embodiments, data store 125 may constitute a website server providing access to an Internet site, such as a site providing e-mail accounts, access to content and/or media, access to other accounts (e.g., e-mail accounts, financial accounts or social networking accounts). For example, in one embodiment, data store 125 may provide access to content (articles, media, user profiles, etc.) that is accessible for free or that is accessible to subscribers or other authorized users. Thus, although illustrative embodiments described herein may refer to data store 125 as containing product or service data (e.g., from an e-commerce website), in some embodiments, data store 125 may include data related to news or commentary (e.g., a news website), data associated with a social networking profile (e.g., a social networking website), data stored from the Internet (e.g., as indexed by an Internet search portal), among many other possibilities.

Data store 125 may continually receive and store new product and/or service information such that data store 125 is continually expanding and/or shrinking in scope and breadth. For example, data server 120 may receive new product information periodically at predetermined intervals over network 130. Alternatively, data server 120 may receive new product information ad hoc as new information becomes available and product offerings are added to a catalog. Likewise, information may be removed from data store 125, such as when items are no longer available through the electronic catalog. Storing a large and potentially dynamic library of images in data store 125 provides a large and evolving vocabulary of data for security challenges, thus mitigating the possibility of computer programs answering security challenges correctly through automated responses. Furthermore, maintaining a diverse group of images mitigates the possibility of automated programs analyzing all of the images in a library.

Terminals 140-160 may be any type device for communicating with authentication server 110 and/or data server 120 over network 130. For example, terminals 140-160 may be personal computers, handheld devices (e.g., PDAs, cellular phones, electronic book readers, etc.), set top boxes, or any other appropriate computing platform or device capable of exchanging data with network 130. Terminals 140-160 may, each include a processor and a memory (not shown). Furthermore, terminals 140-160 may execute program modules that provide one or more graphical user interfaces (GUIs) for interacting with network resources, such as authentication server 110 and/or data server 120. Although users of terminals 140-160 may access and/or receive data from authentication server 110 and/or data server 120, in one embodiment, users at terminals 140-160 may access and/or receive data directly from authentication server 110.

Authentication server 110 may retrieve appropriate data from data server 120 and serve such data to users at terminals 140-160. Users may include, among many other possibilities, individuals purchasing products and/or services or individuals listing products and/or services for sale through the use of an Internet site provided by authentication server 110. Furthermore, users may include individuals having electronic accounts, such as accounts storing data in electronic form (e.g., files), e-mail accounts, financial accounts, social networking accounts, and the like.

Users may access authentication server 110 over network 130 through an Internet browser or other software application running on any one of terminals 140-160. For example, authentication server 110 may transmit a document (e.g., a JavaScript Object Notation (JSON) document, an Extensible Markup Language (XML) document, or a web page) that is accessible by an Internet browser executing on one of terminals 140-160. The document may include options for a user to log onto a secure site provided by authentication server 110, which disclosed systems and methods are designed to protect. Because the Internet site may use a secure communication environment, such as an HTTPS (hypertext transfer protocol secure) environment to transfer data over network 130, data transfer is assumed to be secure.

Users may log onto a secure site provided by authentication server 110 by supplying credentials, such as a username and a password. Consistent with disclosed embodiments, authentication server 110 may also require the user to respond to a security challenge after authenticating the username and password. In other disclosed embodiments, authentication server 110 may require the user to respond to a security challenge to access a particular document (e.g., to perform a new transaction or view a different product offering). In such an embodiment, authentication server 110 may have previously authenticated the username and password combination. In still other disclosed embodiments, authentication server 110 may require the user to respond to a security challenge in lieu of, or before, submitting a username and password combination.

According to some embodiments, a security challenge may present one or more images of particular items from the electronic catalog of data store 125 to a user. For example, the items may be products and the images may represent the products. According to some embodiments, the images presented to the user are book covers, album covers, and/or movie covers. The images that are presented may be altered (e.g., the images may be manipulated such that text is warped) to hinder computer programs from easily using OCR technology to read the text. Alternatively, or in addition, the images may be presented such that some of the images are flipped or rotated over one axis or another, for example (e.g., displayed upside-down, on its side, rotated a number of degrees, etc.). Accordingly, to respond to a security challenge correctly, a user may need to identify or select images that are presented differently from other images (e.g., identify or select the images that are displayed upside-down). Other variations of security challenges are consistent with disclosed embodiments. For example, various attributes know about the item represented by the image may be used as at least one basis of the security question. For example, users may be asked to identify or select which of a number of images of presented book covers are covers for a particular genre (e.g., horror novels, westerns, etc.). Security challenges are discussed below in further detail.

Figure 2:
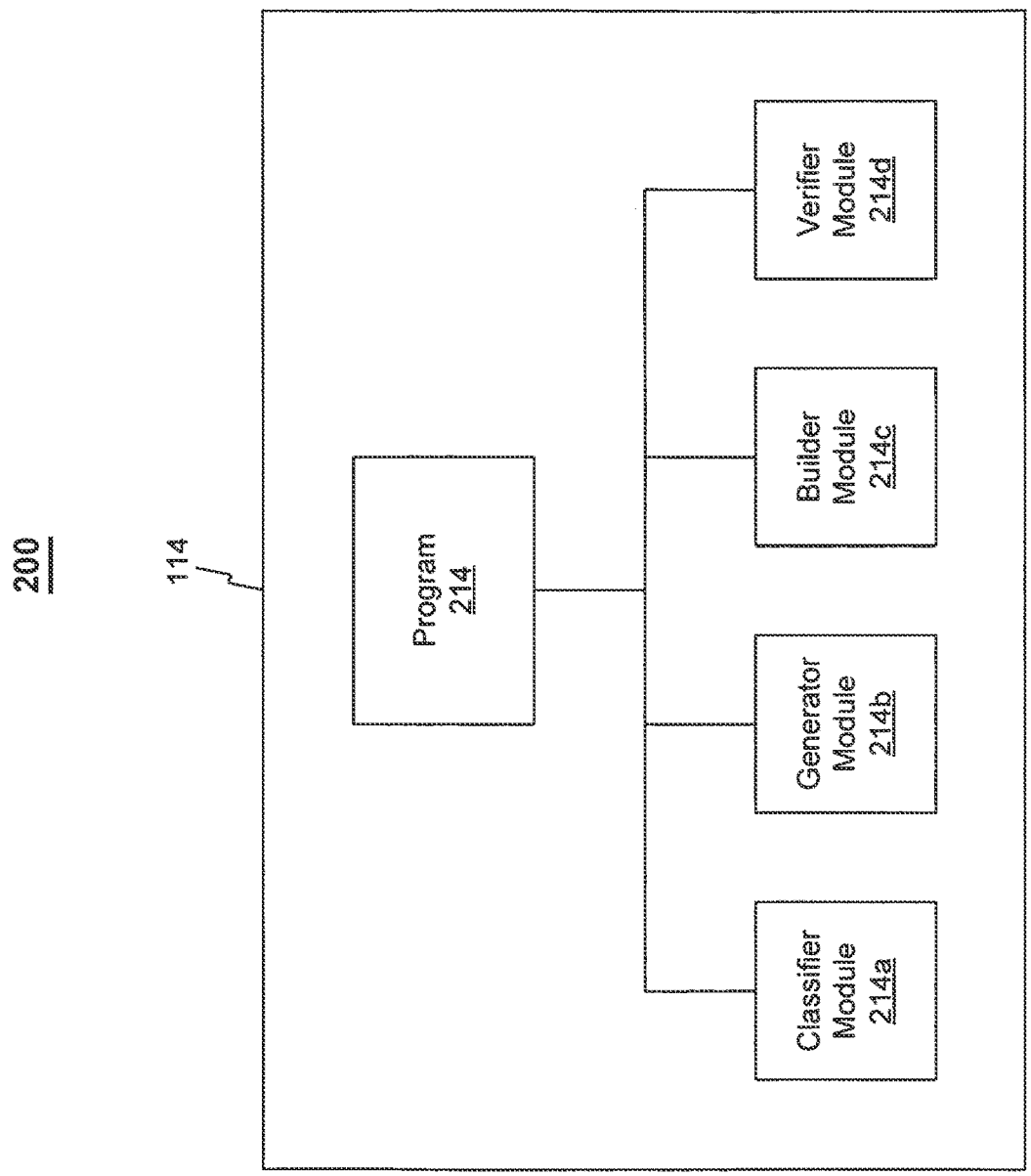
FIG. 2 is diagram of an example of a software architecture providing functionality for distinguishing humans from computers using images.

FIG. 2 is diagram of an example 200 of a software architecture providing functionality for distinguishing humans from computers using images, consistent with a disclosed embodiment. The software architecture may be stored in, for example, memory 114 of authentication server 110, as shown in FIG. 1.

In a service-oriented architecture (SOA), resources called services perform particular functions and are accessible in a standardized way over a network. The services are considered standardized because distributed program components can invoke the services without any knowledge of an underlying platform that supports the services. Accordingly, in one embodiment, memory 114 may store instructions of program 214, which when executed, perform one or more data processes (e.g., services) for providing a security challenge. To do so, program 214 may include instructions in the form of one or more program modules 214a-214d. Program modules 214a-214d may include a classifier module 214a, a generator module 214b, a builder module 214c, and a verifier module 214d. Although program 214 is shown as being stored in memory 114, one of ordinary skill in the art will recognize that program 214 may be distributed across multiple components (e.g., one or more of program modules 214a-214d may reside on separate components available over network 130).

Classifier module 214a may determine whether or not to use certain images (e.g., book covers, DVD covers, CD covers, etc.) that are stored in data store 125 in security challenges. As discussed above, in some embodiments, to provide a robust vocabulary for security challenges, data store 125 may maintain a large image library that is constantly evolving. Alternatively, or in addition, data store 125 may store a massively large image library comprising a large number of images (e.g., millions of images). Although, for example, most book covers include text, some book covers may not include text and/or may not provide image clues that aid a viewer in determining whether the image is upside-down. Accordingly, classifier module 214a may perform statistical operations on candidate images to classify whether or not the candidate images have enough "text-like" qualities, or other image clues, such that the image will not confuse persons viewing them as part of security challenges.

Classifier module 214a may determine whether or not to use certain images in security challenges when the images are received by authentication server 110 and/or data server 120 for storage in data store 125. For example, when receiving a new image, classifier module 214a may execute instructions to evaluate whether or not the image is one that should be made available for security challenges (e.g., images having text of a predetermined size and/or clarity). Furthermore, classifier module 214a may generate metadata for the image that indicates whether or not the image is appropriate for security challenges. Alternatively, classifier module 214a may store the image in a designated storage location of data store 125 depending upon whether or not the image is deemed appropriate for security challenges. As a further alternative, classifier module 214a may update a table stored in data store 125. The table may store identifiers of appropriate images for security challenges.

As discussed above, classifier module 214a may perform statistical operations on candidate images to classify whether or not the candidate images are appropriate for security challenges. One statistical technique that classifier module 214a may employ evaluates the average variance by row of the image. Classifier module 214a may perform this operation on the green color component of an image, which is the component most closely representing grayscale. Variance of a row is defined as $SUM_i((P(i)-M)*(P(i)-M))/N$, where M is the mean of the pixel values in the row, P(i) is the value of pixel i, N is the number of pixels in the row, and $SUM_i$ refers to the sum of the values, where i varies from 0 to N. That product produces a number per row, and that value may be averaged across the image to obtain a final Average Row Variance (ARV) score. For example, an image having an AVR score equal to or above a certain threshold may indicate that the image considered to be appropriate for security challenges.

Another statistical technique that classifier module 214a may employ evaluates the average edge variance by row of an image. Classifier module 214a may perform this operation, on a row-by-row basis, on the green component of the image, as well as perform an edge-detection algorithm, followed by computing the variance of the resulting row image. This calculation produces a number per row, which is then averaged across the image to obtain a final Average Row Edge Variance (AREV) score. This technique may eliminate different kinds of unacceptable images that would nevertheless have passed the ARV threshold. For example, an image having an AREV score equal to or above a certain threshold may indicate that then image is appropriate for security challenges.

Still yet another statistical technique that classifier module 214a may employ evaluates the so-called "textiness" of an image. Classifier module 214a may perform an operation, on a row-by-row basis to distinguish "texty" sorts of edges from other sorts of edges in an image. The technique may further employ a ratio of rising versus falling edges of the images in order to classify the images. For example, an image having a ratio equal to or above a certain threshold may indicate that then image is appropriate for security challenges.

Generator module 214b may determine when to generate a service request for a security challenge. To determine when to present a security challenge, generator module 214b may consider data received from the user's terminal, the page the user is viewing or attempting to view, a status of the user account (i.e., whether an account has been marked for suspected fraud), or whether the user has supplied a username and password that has been authenticated.

Generator module 214b may present the security challenge to a user after verification of a username and password combination or upon the occurrence of another event. In some disclosed embodiments, the security challenge question may follow authentication of a username and password combination. However, in other disclosed embodiments, the security challenge question may not follow authentication of a username and password combination. For example, generator module 214b may present the security challenge question to a user when the user makes a selection of, or attempts to navigate to, a particular portion or document of an Internet site (e.g., when the user selects a link to view and/or change payment information, shipping address information, or a password). In another embodiment, generator module 214b may present the security challenge to a user when authentication server 110 detects an unrecognized Internet Protocol (IP) address of the user's terminal or when the user attempts to purchase a new item. In yet another embodiment, generator module 214b may present the security challenge to a user when generator module 214b no longer detects a cookie (e.g., an object storing information, such an identifier of the user, user preferences, active shopping cart information, etc.) on the user's terminal.

When generator module 214b determines that a security challenge should be presented, generator module 214b may create a unique ID corresponding to the security challenge.

Figure 3:
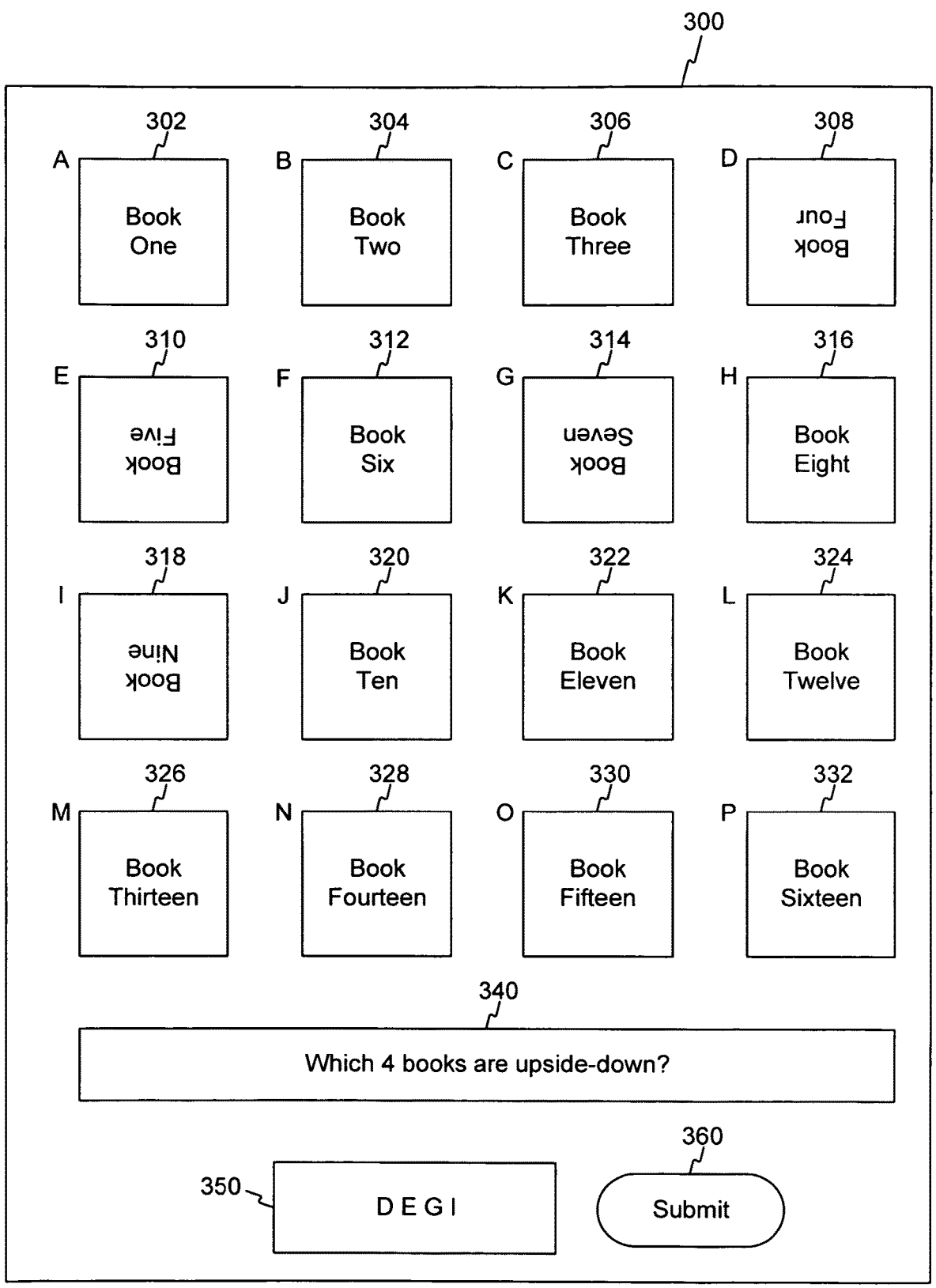
FIG. 3 is an example of a user interface including a security challenge using images.

Builder module 214c may receive a request and generate a security challenge for the unique ID. The security challenge may include, for example, a group of images selected from data store 125. Images may be selected from data store 125 based on, for example, metadata classifying certain images as being appropriate for security challenges. Builder module 214c may select the images, for example, using a randomizing function or based on predetermined criteria (e.g., based on date of publication, genre, etc.). Builder module 214c may further determine which of the selected images to alter. For example, some images may be distorted and/or flipped or rotated over one axis or another. Moreover, builder module 214c may format and transmit a response message having the unique ID and other data for the security challenge to one of terminals 140-160. FIG. 3 provides an example of a user interface including a security challenge and is discussed below in further detail.

Verifier module 214d may receive and evaluate responses to security challenges. For example, a user may, in responding to a security challenge, check a box next to displayed images, click and/or highlight images, use voice and/or touch selection, or drag/dropped icons of the images, or select images from pull-down lists for various categories, for example. Data representing the selection or selections is then received from terminals 140-160 by verifier module 214d, which determines whether or not the selection or selections are correct.

After receiving an incorrect selection, verifier module 214d may determine whether or not to suspend access to a user account (e.g., indefinite or locked for a predetermined time period). Furthermore, verifier module 214d may determine whether to provide a second security challenge in the event of an incorrect answer. For example, after an incorrect answer, verifier module 214d may prevent a user from logging into the account for a predetermined period of time (e.g., must wait an hour) or the user could be locked out until the user contacts customer service. If a user makes a mistake, verifier module 214d may determine whether to present a new security challenge or whether to let the user make a second attempt at solving the current security challenge.

Although program modules 214a-214d have been described above as being separate modules, functionalities provided by one or more modules may be combined in keeping with the spirit and scope of the disclosed embodiments.

FIG. 3 is an example of a user interface 300 providing a security challenge using images, consistent with a disclosed embodiment. As discussed above, authentication server 110 may transmit data for user interface 300 including a challenge question after authenticating a username and password combination or after the user has navigated to or attempted to navigate to a particular page. Furthermore, authentication server 110 may determine which images to include in the security challenge question, as discussed above. Although the following example relates to images of book covers, other kinds of security challenges are consistent with disclosed embodiments. For example, instead of images of book covers, images of other products (e.g., video and/or audio discs (DVDs, CDs, etc.)) or other image types (e.g., images of persons, buildings, animals, maps, landscapes, etc.) may be used.

User interface 300 includes images 302-332. As shown in FIG. 3, each of images 302-332 is accompanied by an identifying letter (i.e., "A" through "P"). Although letters are shown in FIG. 3, any suitable identifier may accompany images 302-332. Furthermore, although four rows including four images per row are shown in FIG. 3, other arrangements and numbers of images may be used in a security challenge in keeping with the spirit and scope of disclosed embodiments.

User interface may include a message 340, which may provide instructions for responding to the security challenge. Although message 340 is shown as being displayed at the lower portion of user interface 300, message 340 may be located in any appropriate portion of user interface 300. As shown in user interface 300, message 340 states, "Which four books are upside-down?" That is, the illustrative message specifies the number of images that the user is to identify. Alternatively, other messages may be used that omit an identification of a particular number and, instead, state, for example, "Which books are upside-down?" or "Which books are sideways?" Still further, the security challenge may require a selection of an image that is not upside-down from that is displayed amongst images that are upside-down. For example, the user may select an image that is right-side up from among other images, some of which are upside-down and/or sideways, etc. In the example shown in FIG. 3, a user must select images of four book covers that appear up-side down to correctly answer the security challenge.

To solve the security challenge shown in user interface 300, the user enters into answer box 350 the letters corresponding to one or more images that appear upside down (i.e., in this example, letters "D", "E", "G", and "I"). Alternatively, the security challenge may prompt the user to check a box next to the displayed images, click and/or highlight images, use voice and/or touch selection, or drag/dropped icons of the images, or select images from pull-down lists for various categories, for example. Once the user has completed selecting or identifying the images, the user may select submit button 360 to submit a response to authentication server 110.

After correctly answering the security challenge, authentication server 110 may transmit a response message to one of terminals 140-160 indicating that the response was correct and/or may provide access to previously restricted data. Furthermore, subsequent to a correct response, for an additional layer of security, authentication server 110 may present a second security challenge (i.e., to be authenticated, the user must answer correctly consecutive security challenge questions). Subsequent to an incorrect response, authentication server 110 may present the user with a second chance to correctly answer the same security challenge or may present the user with a chance to answer a new security challenge.

Figure 4:
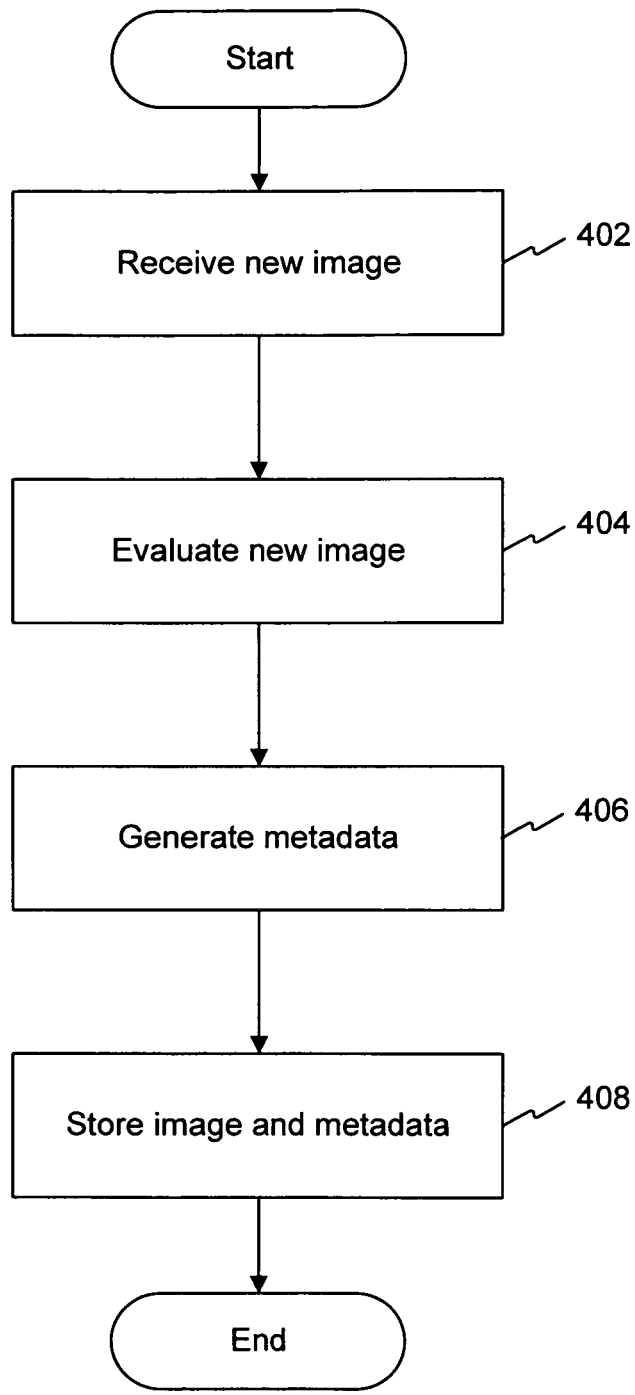
FIG. 4 is a flow diagram of an example of a routine for determining whether an image is appropriate for a security challenge.

FIG. 4 is a flow diagram of an example of a routine 400 for determining whether an image is appropriate for security challenges, consistent with a disclosed embodiment. Routine 400 may implement processes according to one or more of program modules 214a-214d.

At the start of routine 400, in block 402, authentication server 110 may receive a new image. For example, authentication server 110 may receive a new image over network 130 from a server (not shown). The image may relate to or depict product or other item. For example, the image may be appropriate for being incorporated as part of a product listing. Alternatively, data server 120 may receive the new image directly.

In block 404, authentication server 110 may evaluate the new image to determine whether the image is appropriate for security challenges. For example, authentication server 110 and/or one of terminals 140-160 may call a service provided by classifier module 214a, as discussed above, to determine whether or not the image should be used in security challenges. For example, a call to a service may encompass any direct or indirect mechanisms by which any authentication server 110, any one of modules 214-214d, or other software residing on terminals 140-160 provides information that invokes certain behavior in another software component.

In block 406, authentication server 110 may generate metadata based on the determination made in block 404. The metadata may indicate whether or not the image is appropriate for security challenges. Appropriateness of the images may be based, for example, on presence of text, the size and/or clarity of the text, and/or other clues appearing in the image to add an observer in easily distinguishing whether or not the image is upside-down. Metadata describing the appropriateness of the image may be added to other metadata pertaining to the image (e.g., other metadata classifying the image to a particular product category).

In block 408, authentication server 110 may transmit the image and metadata to data server 120, which may store the image and metadata in data store 125.

Figure 5:
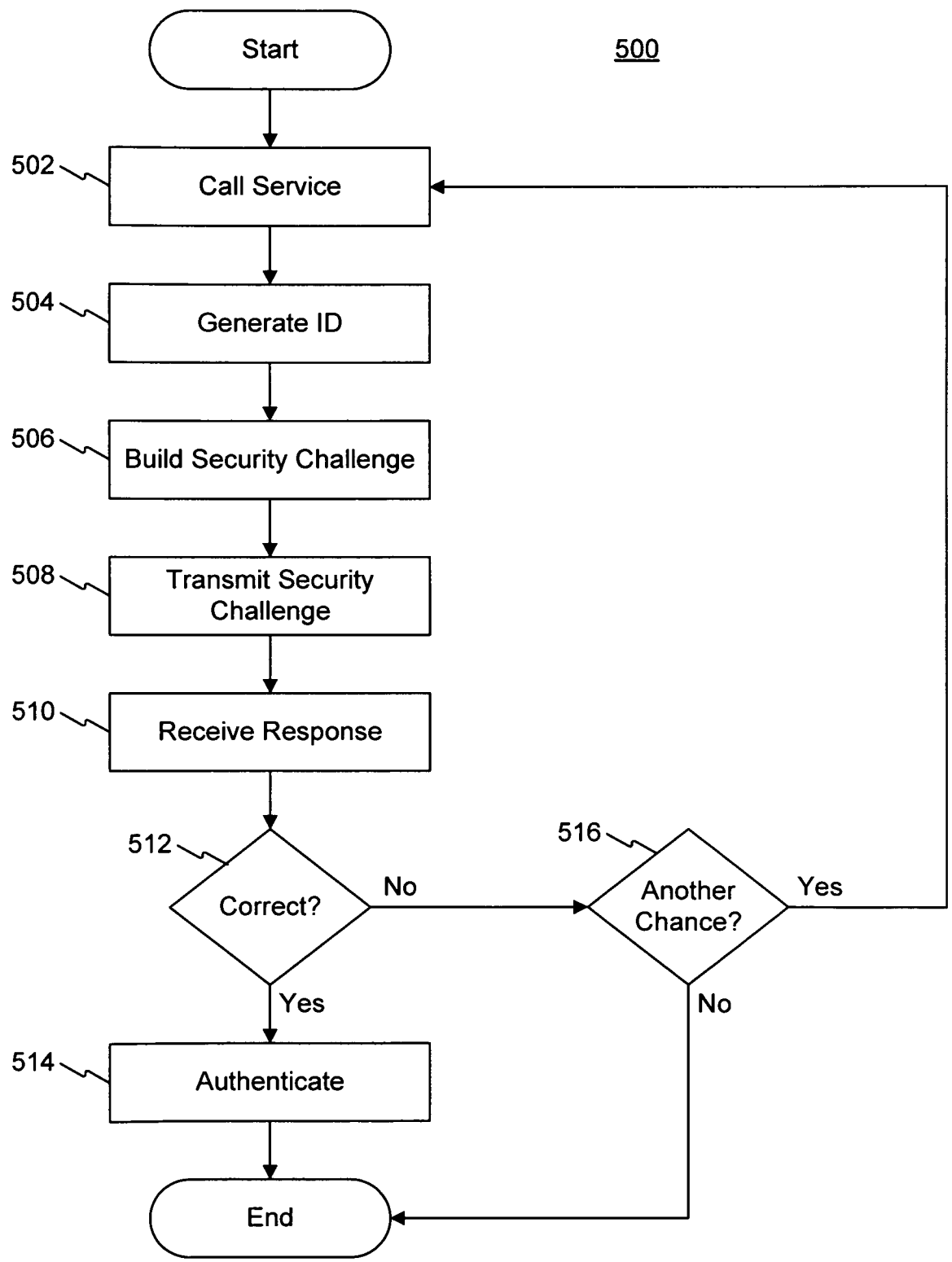
FIG. 5 is a flow diagram of an example of a routine for providing a security challenge using images.

FIG. 5 is a flow diagram of an example of a routine 500 for providing a security challenge using images, consistent with a disclosed embodiment. Routine 500 may implement processes according to one or more of program modules 214a-214d and may include causing authentication server 110 to transmit data for a user interface, such as user interface 300.

At the start of routine 500, in block 502, generator module 214b may receive a call to generate a security challenge. For example, authentication server 110 may consider data received from the user's terminal, the page the user is viewing or attempting to view, a status of the user account (i.e., whether an account has been marked for suspected fraud), or whether the user has supplied a username and password that has been authenticated.

Next, in block 504, generator module 214b may generate a unique ID to identify the security challenge. Authentication server 110 may use the unique ID to correlate a subsequent response to the security challenge.

In block 506, builder module 214c may receive a request and select images for the security challenge. Builder module 214c may select the images based on, for example, a random selection of images stored by data store 125 that have been deemed appropriate for security challenges. For example, builder module 214c may select the images based on image metadata, may select images from a designated storage location of data store 125, and/or may select the images based on identifiers of the image, as indicated by a table stored in data store 125. Builder module 214c may use additional or other criteria to selection images, such as, for example, publication dates, genres, etc.

Builder module 214c may further determine the format of the security challenge. For example, builder module 214c may determine that the security challenge should include images that are upside-down and/or distorted in some fashion. Builder module 214c may also format and assemble the security challenge, such as generating a document including the images. The document may further include appropriate instructions for responding to the security challenge (e.g., "Which images appear upside-down?" or "Which image is not upside-down?"). For example, the security challenge may require selecting one or more images that are upside-down from one or more images that are oriented in a different manner (e.g., right-side up, sideways, rotated a number of degrees, etc.). In another embodiment, the security challenge may require selecting one or more images that are right-side up from one or more images that are oriented in a different manner (e.g., upside-down, sideways, rotated a number of degrees, etc.).

In block 508, builder module 214c may transmit an assembled security challenge to one of terminals 140-160 that requested the challenge. For example, builder module 214c may transmit data for the security challenge, including the images selected in block 506 and instructions for responding to the security challenge, to one of terminals 140-160.

In block 510, verifier module 214d may receive a response from one of terminals 140-160. For example, the user may have been instructed to check a box, click and/or highlight selections, use voice, touch, drag/drop icon, or select images from pull-down lists for various categories. As shown in FIG. 3, in one embodiment, the user types a response using an input device (e.g., a keyboard) into answer box 350 and selects submit button 360 to submit the response.

In block 512, verifier module 214d may determine whether the response is correct. If the received response is correct, routine 500 proceeds to block 514. In some embodiments, the selection of images must be exactly correct (i.e., the user must have selected all images that appear upside down). However, in other embodiments, a majority of correct selections may be sufficient to constitute a correct selection as long as no incorrect images are selected. For example, selecting two out of three images that are upside-down may be sufficient. In contrast, selecting two images that are not upside-down and one image that is upside-down may not be sufficient.

In block 514, verifier module 214d authenticates the user and routine 500 completes. However, if the received selection is not correct, routine 500 proceeds to decision block 516.

In decision block 516, because the user has incorrectly answered the security challenge, authentication server 110 determines whether or not to give the user another chance. For example, authentication server 110 may determine whether to provide a user with a second chance based on how may incorrect responses have been received or based on a status of an account (e.g., suspected fraudulent activity) associated with the user. For example, if multiple unsuccessful attempts to log into an account have been made, then authentication server 110 may determine that the user should not receive a second chance. If the user is given another chance, routine 500 returns to block 502 and proceeds as discussed above. If the user is not given another chance, then routine 500 ends.

As one of ordinary skill in the art will appreciate, one or more of blocks 402-408 and 502-516 may be optional and may be omitted from implementations in certain embodiments. Furthermore, functionality provided by one or more of blocks 402-408 and 502-516 may be subdivided into multiple blocks.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Furthermore, the blocks of the disclosed routines may be modified in any manner, including by reordering blocks and/or inserting or deleting blocks. It is intended, therefore, that the specification and examples be considered as illustrative only, with a true scope and spirit being indicated by the following claims and their full scope of equivalents.

What is claimed is:

1. A computer-implemented method for providing a security challenge, comprising:
    selecting, by a computing device, a subset of images from a plurality of images based at least in part on the subset of images including a number of text-like edges that exceed a threshold, where the text-like edges are determined based at least in part on a ratio of rising versus falling edges depicted in images of the plurality of images;
    orienting, by the computer device, at least one image of the subset of images in a different direction from other images in the subset of images;
    providing, by the computing device, a security challenge comprising the subset of images including at least the number of text-like edges that exceed the threshold;
    receiving, by the computing device via a communication network, a selection of one or more of the images included in the subset of images; and
    determining, by the computing device, the selection of the one or more of the images in the subset of images is oriented for display in the different direction than the other ones of the images in the subset of images.

2. The computer-implemented method of claim 1, further comprising determining, by the computing device, the text-like edges included on respective images is of a size and clarity.

3. The computer-implemented method of claim 1, further comprising determining, by the computing device, the security challenge can include the subset of images based at least in part on metadata associated with respective images of the subset of images.

4. The computer-implemented method of claim 1, further comprising providing instructions for responding to the security challenge.

5. The computer-implemented method of claim 1, further comprising:
    distorting one or more of the images in the subset of images, the one or more images including different text content from the images in the subset of images; and
    including the one or more images in the security challenge.

6. The computer-implemented method of claim 1, further comprising:
    orienting at least one image of the subset of images upside-down, the at least one image including different text content from the subset of images; and
    including the at least one of the images in the security challenge.

7. The computer-implemented method of claim 1, further comprising:
    orienting at least one of the images included in the subset of images right-side up, the at least one image including different text content from the subset of images; and
    including the at least one image in the security challenge.

8. The computer-implemented method of claim 1, further comprising determining the plurality of images from images of products that include text.

9. The computer-implemented method of claim 1, further comprising determining the plurality of images from images of book covers including text.

10. A system for providing a security challenge, the system comprising:
    an authentication server that:
        obtains a plurality of images;
        generates a security challenge comprising a subset of images of the plurality of images comprising a ratio of rising versus falling edges depicted in the subset of images that is above a certain threshold;
        orients at least one image included in the security challenge to a different direction than other images in the subset of images;
        receives via a communication network a selection received at a user device of one or more of the images included in the security challenge; and
        determines the selection of one or more of the images is oriented for display in a different direction than the other images in the subset of images.

11. The system of claim 10, further comprising a data store that stores metadata indicating whether the plurality of images are appropriate for security challenges.

12. The system of claim 10, wherein the authentication server orients at least one of the images included in the subset of images upside-down.

13. The system of claim 10, wherein the authentication server orients at least one of the images included in the subset of images is oriented for display right-side up.

14. The system of claim 10, wherein the authentication server determines the plurality of images from book covers that include text.

15. A computer-implemented method comprising:
    generating a security challenge by at least selecting a subset of images from a set of images based at least in part on a ratio of rising versus falling edges depicted in the subset of images exceeding threshold;

modifying the security challenge by at least causing a first image of the set of images to be rotated by a number of degrees;
providing the security challenge to a computing device via a communication network; and
receiving, from the computing device, a selection of the first image in response to the security challenge.

16. The computer-implemented method of claim 15, wherein the computer-implemented method further comprises determining that the set of images can be included in the security challenge based on metadata associated with the set of images.

17. The computer-implemented method of claim 15, wherein rotating the first image by the number of degrees causes text depicted in the first image to be displayed upside down.

18. The computer-implemented method of claim 15, wherein generating the security challenge further comprises selecting a second image to be included in the security challenge based on a number of edges existing in rows of pixels in the second image.

19. The computer-implemented method of claim 15, wherein the set of images further comprises images of book covers.

20. The computer-implemented method of claim 15, wherein generating the security challenge further comprises selecting a second image to be included in the security challenge based at least in part on a variance of rows of pixels in the second image exceeding a second threshold.

* * * * *